United States Patent
Ficarra

(10) Patent No.: US 9,788,688 B1
(45) Date of Patent: Oct. 17, 2017

(54) COMBINATION BARBECUE GRILL AND SMOKER APPARATUS

(71) Applicant: Salvador Ficarra, Covington, LA (US)

(72) Inventor: Salvador Ficarra, Covington, LA (US)

( * ) Notice: Subject to any disclaimer, the term of this patent is extended or adjusted under 35 U.S.C. 154(b) by 0 days.

(21) Appl. No.: 15/362,291

(22) Filed: Nov. 28, 2016

Related U.S. Application Data

(63) Continuation of application No. 13/974,836, filed on Aug. 23, 2013, now Pat. No. 9,504,354.

(51) Int. Cl.
*A47J 37/07* (2006.01)
*F24C 1/02* (2006.01)

(52) U.S. Cl.
CPC ....... *A47J 37/0713* (2013.01); *A47J 37/0786* (2013.01); *F24C 1/02* (2013.01)

(58) Field of Classification Search
CPC ...... A47J 37/07; A47J 37/0713; A47J 37/074; F24C 1/02
USPC ..... 99/445, 444, 375, 400, 408, 425; 126/51
See application file for complete search history.

(56) References Cited

U.S. PATENT DOCUMENTS

| | | | | |
|---|---|---|---|---|
| 462,923 | A * | 11/1891 | Gibbons | F24C 3/027 126/214 C |
| 1,369,758 | A * | 2/1921 | Chippindale | F24C 1/02 126/41 R |
| 1,894,900 | A * | 1/1933 | Victor | F24C 3/126 126/52 |
| 2,304,140 | A * | 12/1942 | Bergholm | A47J 37/0682 126/39 G |
| 2,482,552 | A * | 9/1949 | Korsgren | F24H 3/006 126/104 A |
| 2,542,265 | A * | 2/1951 | Staples | A47J 37/046 126/299 R |
| 2,568,022 | A * | 9/1951 | Parker | F24B 1/22 126/113 |
| 2,602,497 | A * | 7/1952 | Buhman | F23D 14/10 126/41 R |
| 2,790,434 | A * | 4/1957 | Del Francia | A47J 37/0682 126/214 C |
| 2,874,631 | A * | 2/1959 | Cooksley | A47J 37/0709 126/25 A |

(Continued)

*Primary Examiner* — Sean Michalski
(74) *Attorney, Agent, or Firm* — Garvey, Smith & Nehrbass, Patent Attorneys, L.L.C.; Julia M. FitzPatrick; Gregory C. Smith

(57) ABSTRACT

A combination barbeque and smoker apparatus, fabricated of stainless steel, which includes an open vessel portion, having a plurality of walls and a floor portion; a cover moveable from an open position to a closed position covering the open end of the vessel to define an enclosed space; a metal grill positioned on the open end of the vessel upon which meat would rest to barbeque or smoke; a continuous pipe positioned in a space between an inner vessel wall and an outer vessel wall, in a pattern along the rear and side walls of the vessel, the pipe receiving pressurized natural gas from a gas source, such as a pressurized tank; a plurality of openings in the upper wall of the continuous pipe for releasing pressurized gas through the openings; and a device for igniting the gas exiting the openings for defining a source of heat along the length of the pipe into the cover space when the cover is in the closed position for receiving and directing heat downward onto meat resting on the metal grill.

30 Claims, 6 Drawing Sheets

(56) References Cited

U.S. PATENT DOCUMENTS

| | | | |
|---|---|---|---|
| 2,898,846 A * | 8/1959 | Del Francia | A47J 37/0682 126/15 R |
| 2,905,077 A * | 9/1959 | Del Francia | A47J 37/0676 126/41 R |
| 2,940,381 A * | 6/1960 | Cottongim | A47J 37/067 126/163 R |
| 3,040,651 A * | 6/1962 | Nolte, Jr. | A47J 37/0763 126/25 R |
| 3,343,527 A * | 9/1967 | Manteris | A47J 37/0718 126/163 R |
| 3,938,494 A * | 2/1976 | Clark | A47J 37/0713 126/25 R |
| 4,002,113 A | 1/1977 | McLane | |
| 4,462,308 A * | 7/1984 | Wang | A47J 27/04 126/369 |
| 4,662,349 A * | 5/1987 | McKenzie | A47J 37/0682 126/25 B |
| 4,677,964 A * | 7/1987 | Lohmeyer | A47J 37/0713 126/41 R |
| 4,773,319 A * | 9/1988 | Holland | A47J 37/0713 126/25 R |
| 4,800,865 A | 1/1989 | Setzer | |
| 4,850,333 A * | 7/1989 | Dellrud | A47J 37/0718 126/25 A |
| 5,070,857 A * | 12/1991 | Sarten | A47J 37/0704 126/25 A |
| 5,097,817 A * | 3/1992 | Dodgen | A47J 37/0704 126/25 R |
| 5,163,359 A * | 11/1992 | McLane, Sr. | A47J 37/0713 126/25 R |
| 5,293,859 A * | 3/1994 | Lisker | A47J 37/0768 126/25 A |
| 5,313,877 A * | 5/1994 | Holland | A47J 37/0704 126/25 R |
| 5,365,833 A | 11/1994 | Chen | |
| 5,421,319 A * | 6/1995 | Moore, Jr. | A47J 37/0713 126/25 R |
| 5,445,066 A | 8/1995 | Rosset | |
| 5,546,853 A | 8/1996 | Heil et al. | |
| 5,579,680 A | 12/1996 | Graur | |
| 5,605,092 A | 2/1997 | Riccio | |
| 5,676,049 A | 10/1997 | Arnold | |
| 6,038,964 A * | 3/2000 | Sikes | A47J 37/07 126/25 R |
| 6,082,351 A * | 7/2000 | Faraj | A47J 37/0688 126/19 R |
| 6,205,996 B1 | 3/2001 | Ryan | |
| 6,260,478 B1 * | 7/2001 | Harneit | A47J 37/067 99/400 |
| 6,343,545 B1 * | 2/2002 | Patterson | A47J 37/0704 99/423 |
| 6,520,174 B1 * | 2/2003 | Scigliuolo | A47J 37/0786 126/25 R |
| 6,523,461 B1 * | 2/2003 | Johnston | A47J 37/0786 126/25 R |
| 6,557,544 B2 * | 5/2003 | Sim | A47J 37/0704 126/25 A |
| 6,941,941 B1 * | 9/2005 | Hall | A47J 37/0704 126/25 R |
| 6,981,497 B2 * | 1/2006 | DeMars | A47J 37/0704 126/25 R |
| 7,059,240 B2 | 6/2006 | Kim | |
| 7,331,278 B2 | 2/2008 | Stokes, Jr. | |
| 7,640,929 B2 * | 1/2010 | Johnson | A47J 36/06 126/41 R |
| 7,703,386 B1 * | 4/2010 | Bourgeois | A23B 4/0523 99/340 |
| 7,810,485 B2 * | 10/2010 | Messmer | F24C 1/16 126/25 R |
| 8,316,837 B2 * | 11/2012 | Malumyan | A47J 37/0704 126/25 B |
| 8,365,717 B1 * | 2/2013 | Perry | A47J 37/0786 126/152 B |
| 8,726,896 B2 * | 5/2014 | Guillory | A47J 37/0704 126/25 R |
| 8,813,738 B2 * | 8/2014 | Ahmed | A47J 37/0682 126/152 R |
| 9,357,880 B2 * | 6/2016 | Norris | A47J 37/0713 |
| 9,504,354 B1 | 11/2016 | Ficarra | |
| 2006/0112837 A1 * | 6/2006 | Gabrielle | A47J 37/042 99/419 |
| 2008/0105135 A1 | 5/2008 | McFadden et al. | |
| 2009/0241936 A1 * | 10/2009 | Husted | F24B 1/1808 126/512 |
| 2010/0263654 A1 * | 10/2010 | Cusack | A47J 36/12 126/25 R |
| 2012/0012096 A1 * | 1/2012 | Cusack | A47J 36/12 126/312 |
| 2012/0276260 A1 * | 11/2012 | Duncan | A47J 37/0786 426/314 |
| 2012/0288596 A1 * | 11/2012 | Holdo Baggott | A23L 1/0128 426/235 |
| 2014/0026765 A1 * | 1/2014 | Fou | A23B 4/0523 99/445 |
| 2014/0026766 A1 * | 1/2014 | Goff, IV | A47J 37/07 99/445 |
| 2015/0150414 A1 * | 6/2015 | Vogds | A47J 37/0763 126/25 R |
| 2016/0069564 A1 * | 3/2016 | Ahmed | F23D 14/10 126/39 E |
| 2016/0174766 A1 * | 6/2016 | Schlosser | A47J 37/0704 126/25 R |
| 2016/0174767 A1 * | 6/2016 | Schlosser | A47J 37/0704 126/25 R |
| 2016/0183723 A1 * | 6/2016 | Nadal | B23P 19/00 126/25 R |
| 2016/0183724 A1 * | 6/2016 | Nadal | A47J 37/0763 126/25 R |
| 2016/0227964 A1 * | 8/2016 | Van Zutphen | A47J 37/0786 |

* cited by examiner

COMBINATION BARBECUE GRILL AND SMOKER APPARATUS

CROSS-REFERENCE TO RELATED APPLICATIONS

This is a continuation of U.S. patent application Ser. No. 13/974,836, filed on 23 Aug. 2013 (issued as U.S. Pat. No. 9,504,354 on 29 Nov. 2016). Priority of and/or the benefit of U.S. patent application Ser. No. 13/974,836, filed on 23 Aug. 2013 is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to grilling and smoking. More particularly, the present invention relates to an improved grilling barbecue grill and smoker combination wherein the heat provided is directed through burners located in the side walls and rear wall of the grill for directing heat downward onward onto the covered grill.

2. General Background

In the art of barbecuing and grilling meat, the most state of the art manner in doing that is to provide a heat source such as gas or actual charcoals housed within a basket of the grill beneath the meat where the meat is positioned on a grill above the heat source so that heat is directed upward onto the meat. One of the problems confronted in this manner of grilling meat, is two-fold. First, the heat from the coals or burners directly below the meat provides an intense source of heat which often times results in the meat being singed or burned on the face of the meat laying upon the grill. Secondly, the droppings from the meat when it makes contact with the grill or charcoal tends to cause flare ups which cause burned portions of the meat which is both unsightly and may be unhealthy.

Therefore, there is a need in the art for means of directing heat onto meat laid upon a grill which would be other than the direct heat from below the meat. Applicant has done a search of the art and has found the following prior art patents in its search:

| | | | |
|---|---|---|---|
| 4,002,113 | 5,365,833 | 5,605,092 | 6,523,461 |
| 4,773,319 | 5,445,066 | 5,676,049 | 7,059,240 |
| 4,800,865 | 5,546,853 | 6,038,964 | 7,331,278 |
| 5,313,877 | 5,579,680 | 6,205,996 | |

SUMMARY OF THE PRESENT INVENTION

The apparatus of the present invention solves the problems in the art in a simple and straightforward manner. What is provided is a grill for grilling various types of meat, having a base for supporting a container of pressurized natural or propane gas for providing fuel to burners of the grill; the burners of the grill positioned in a space along the side walls and rear wall of the grill basket, so that when the gas being emitted from the burners is lit, the heat of the gas is directed upward through the side walls and rear wall of the basket burner and travels upward into the closed top of the grill wherein the heat is then directed downward onto the meat laid upon the grill. Further, there is provided a tray which may be positionable beneath the meat laid on the grill so as to allow charcoals to be used in place of gas, so that the grill would heat the meat in a more conventional manner, that is heat directed upward onto the meat; there is further provided drainage ports within the base of the basket so that when the meat is being heated via the burners in the wall of the grill, juices from the meat would fall onto the base of the basket and through the openings and into a container for catching any drippings of the meat.

Therefore, it is the principal object of the present invention to provide a barbecue grill and a smoker which would allow meat laying on the grill to be cooked from heat directed downward onto the meat by having the burners positioned within a wall opening of the grill rather than positioned directly beneath the meat laying on the grill.

It is a further object of the present invention to provide a new and improved grill/smoker which would be constructed primarily of stainless steel or cast aluminum and would have various amenities including a tray for containing conventional charcoals in the grill; a rotisserie feature for rotating meat that could be either grilled or smoked when the meat is being cooked via the burners in the wall of the grill; and a means for retrieving any drippings from the meat that is being cooked on the grill.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

Figure 1:
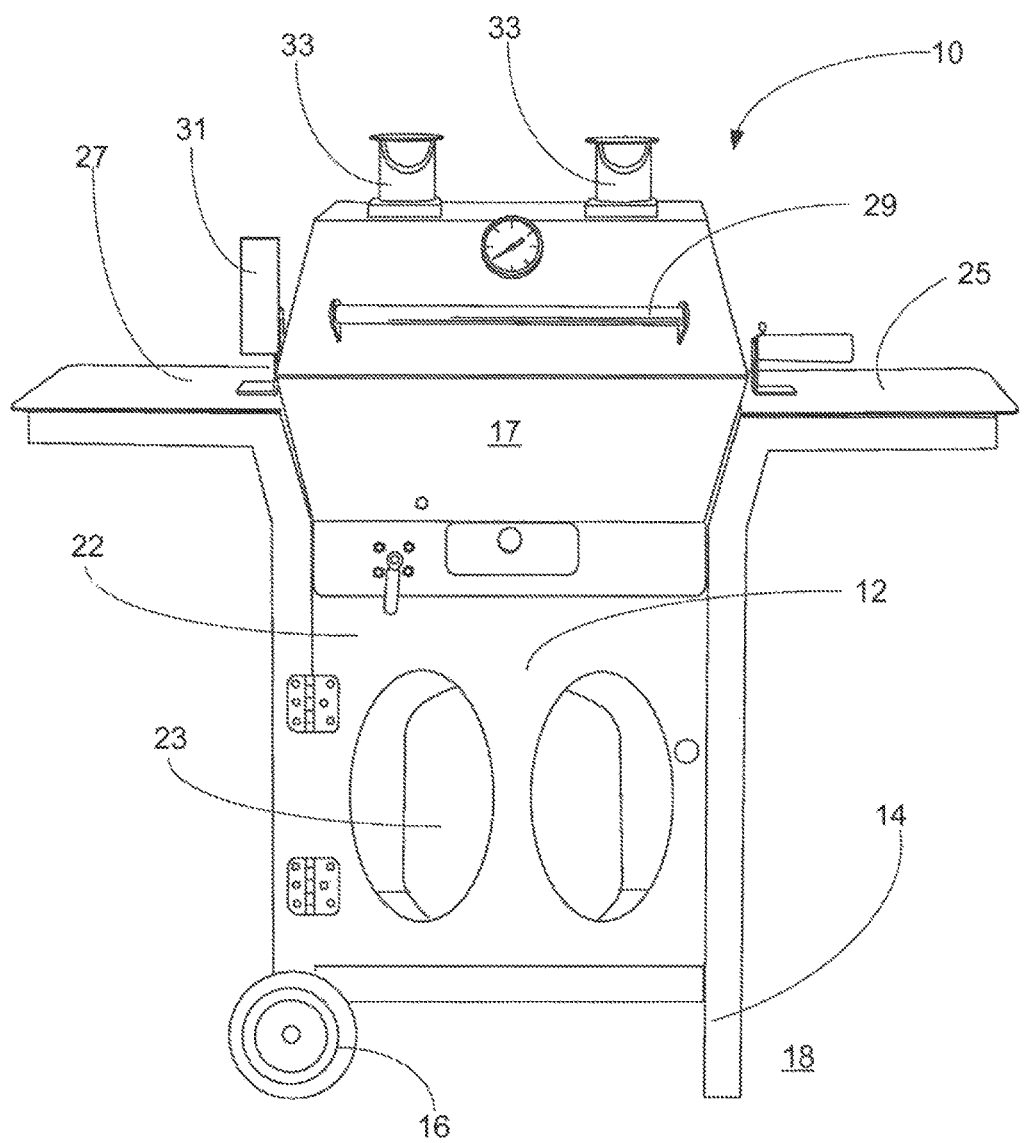
FIG. 1 illustrates an overall front view of the preferred embodiment of the improved grill and smoker of the present invention.

FIGS. 1-9 illustrate the preferred embodiment of the apparatus of the present invention by the numeral 10. As illustrated first in overall views, there is illustrated the apparatus 10 having a base portion 12, which supports the grill assembly 15. The base portion 12 includes pair of legs 14 and a pair of rollers or wheels 16 for allowing the apparatus 10 to be moved upon a deck 18 or the like.

Figure 2:
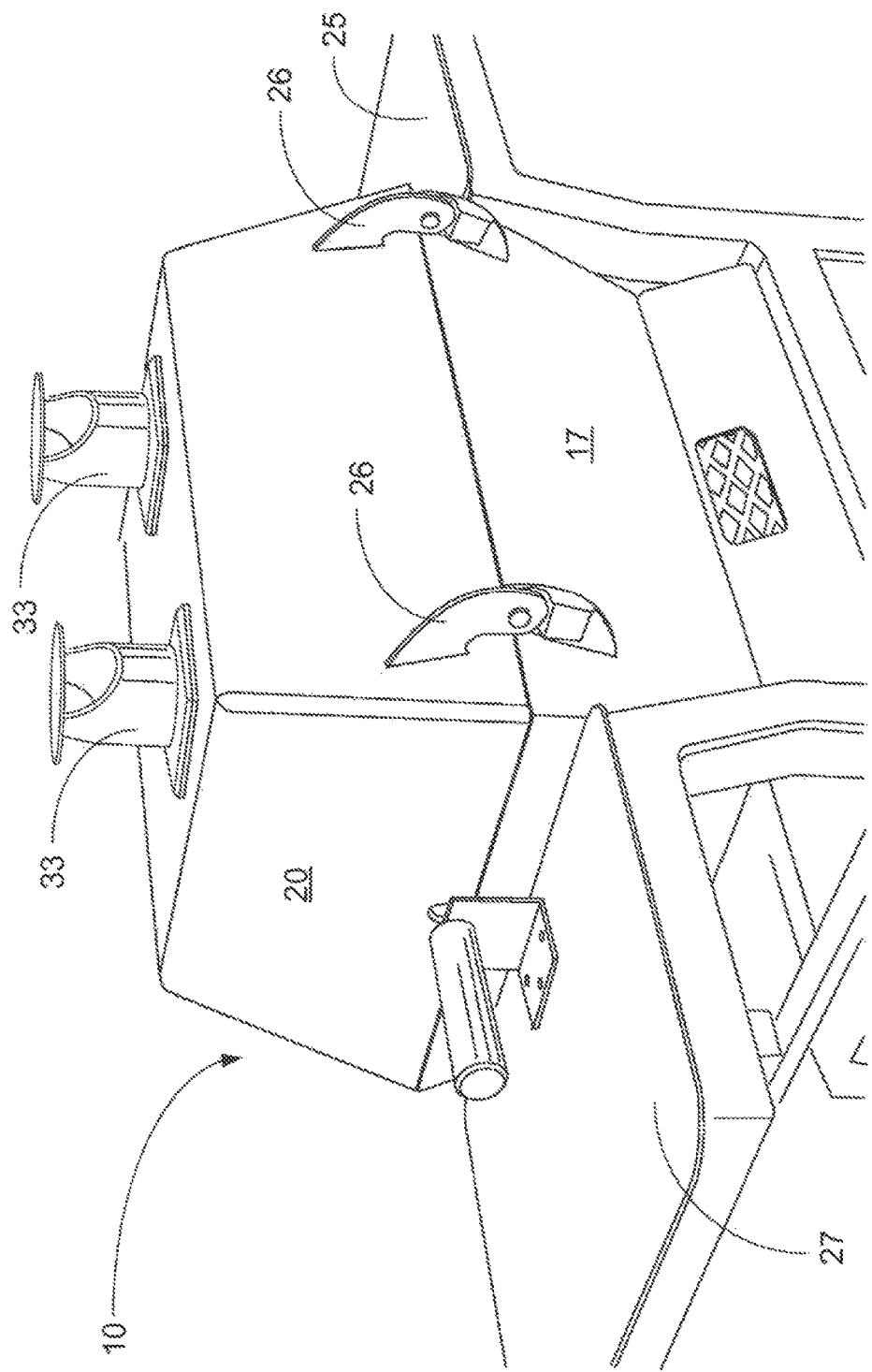
FIG. 2 illustrates a partial overall view of the preferred embodiment of the improved grill and smoker of the present invention as seen from the rear.
Figure 3:
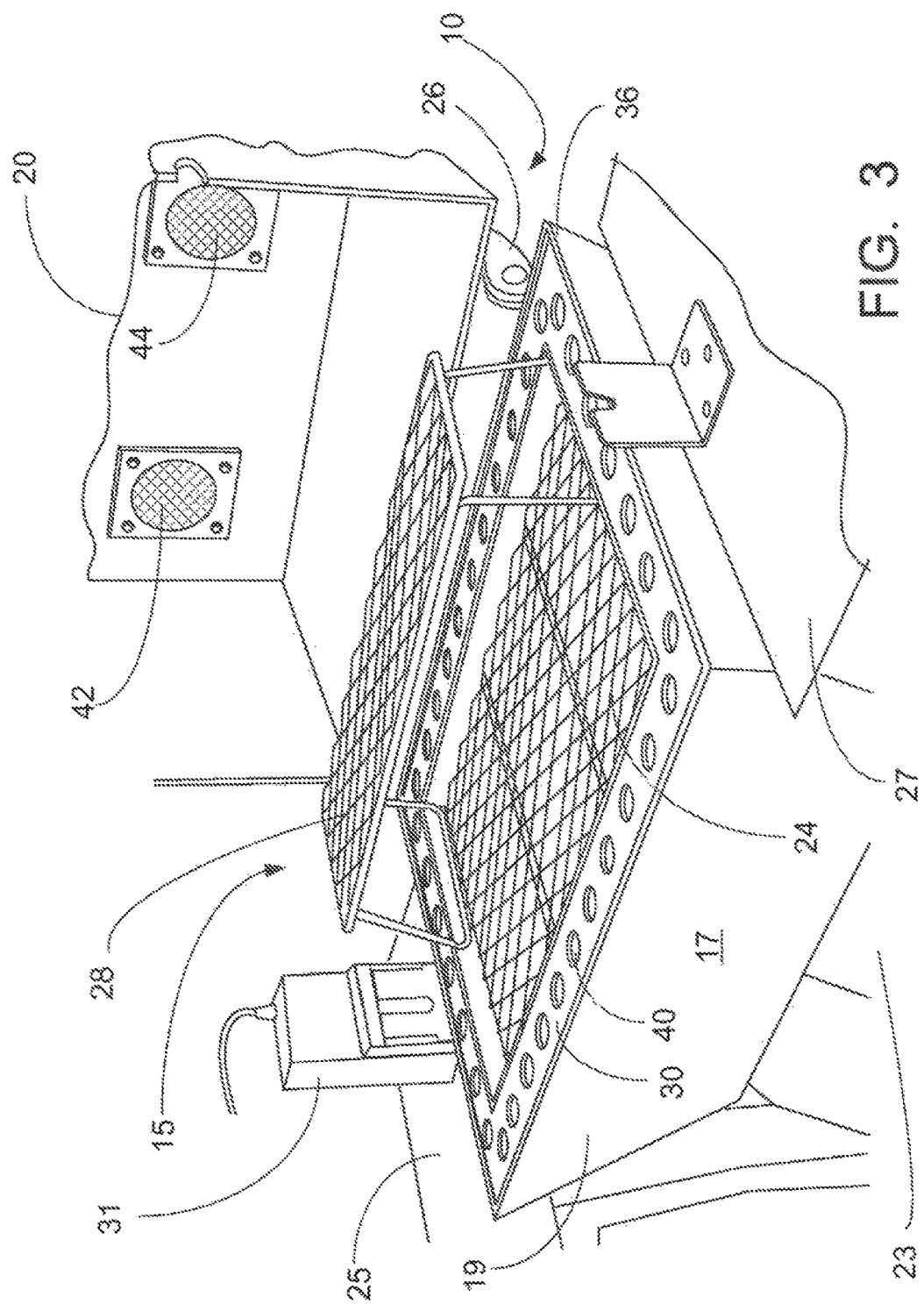
FIG. 3 illustrates a partial overall front view thereof with the top of the grill in the opened position.

Next, as further illustrated in the Figures, the apparatus 10 includes a lid portion 20 hingedly attached to the grill assembly 15, via hinges 26, which can be hinged between the down position as seen in FIG. 2 upward to the open position as seen in FIG. 3, using handle 29. There is also illustrated in FIG. 1, a front door 22 as part of the base portion 12 which houses a typical butane tank 23 of the type which supplies natural gas to a conventional barbecue grill. Also seen in the Figures, the top or lid 20 has a pair of chimneys 33 which allow heat to be moved out of the grill 10 when the lid portion 20 is in the closed position. There is also illustrated a rotisserie motor 31 positioned exterior to the lid portion 20, as seen in FIGS. 1 and 3, there are provided trays 25, 27 on both sides of the grill assembly 15, and there is provided an upper grill tray 28.

Figures 5, 6:
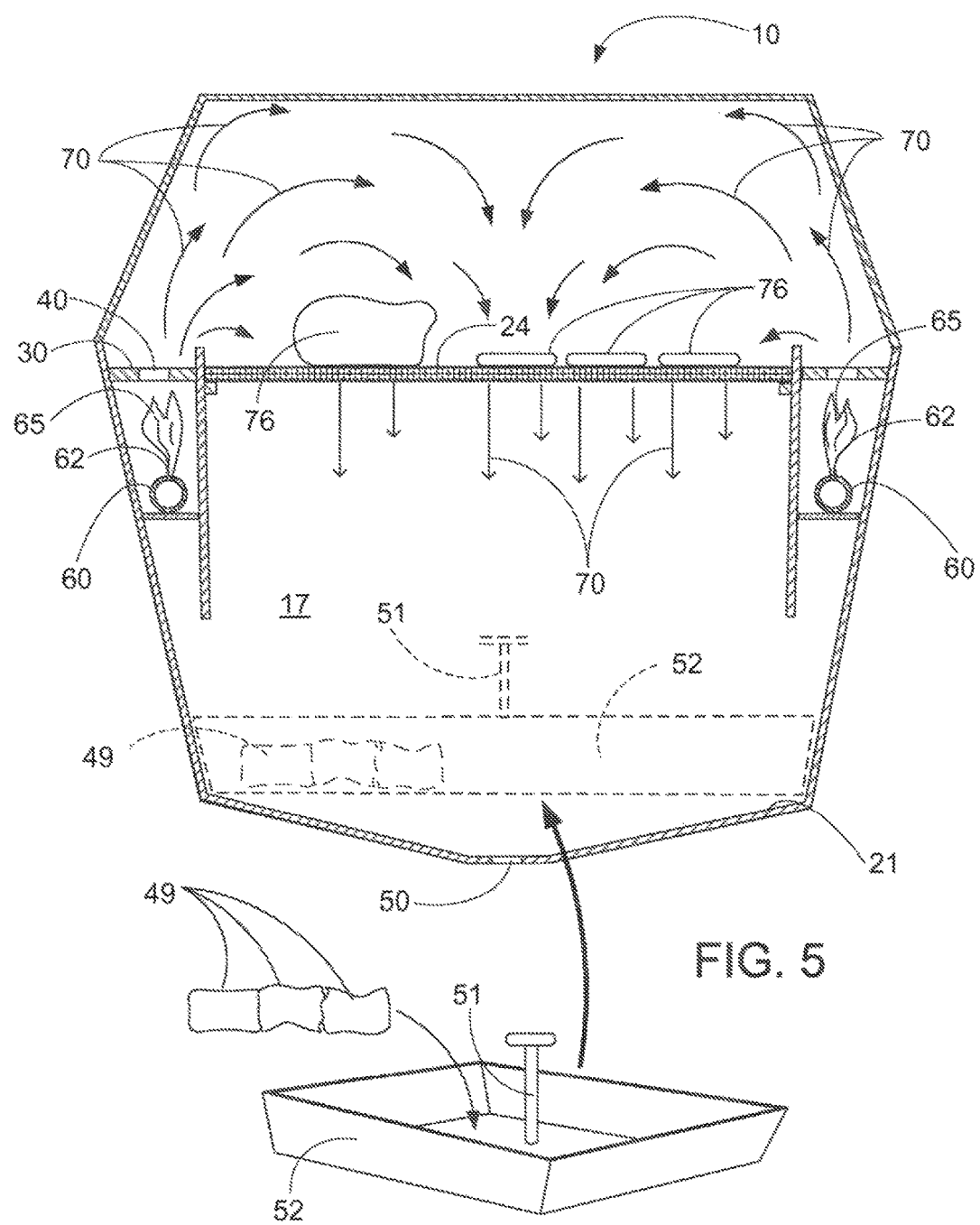
FIG. 5 illustrates a front cross-section view of the preferred embodiment of the improved grill and smoker of the present invention.
FIG. 6 illustrates an overall view of the basket which would house charcoals when charcoals are the source of heat on the grill.
Figures 7, 8, 9:
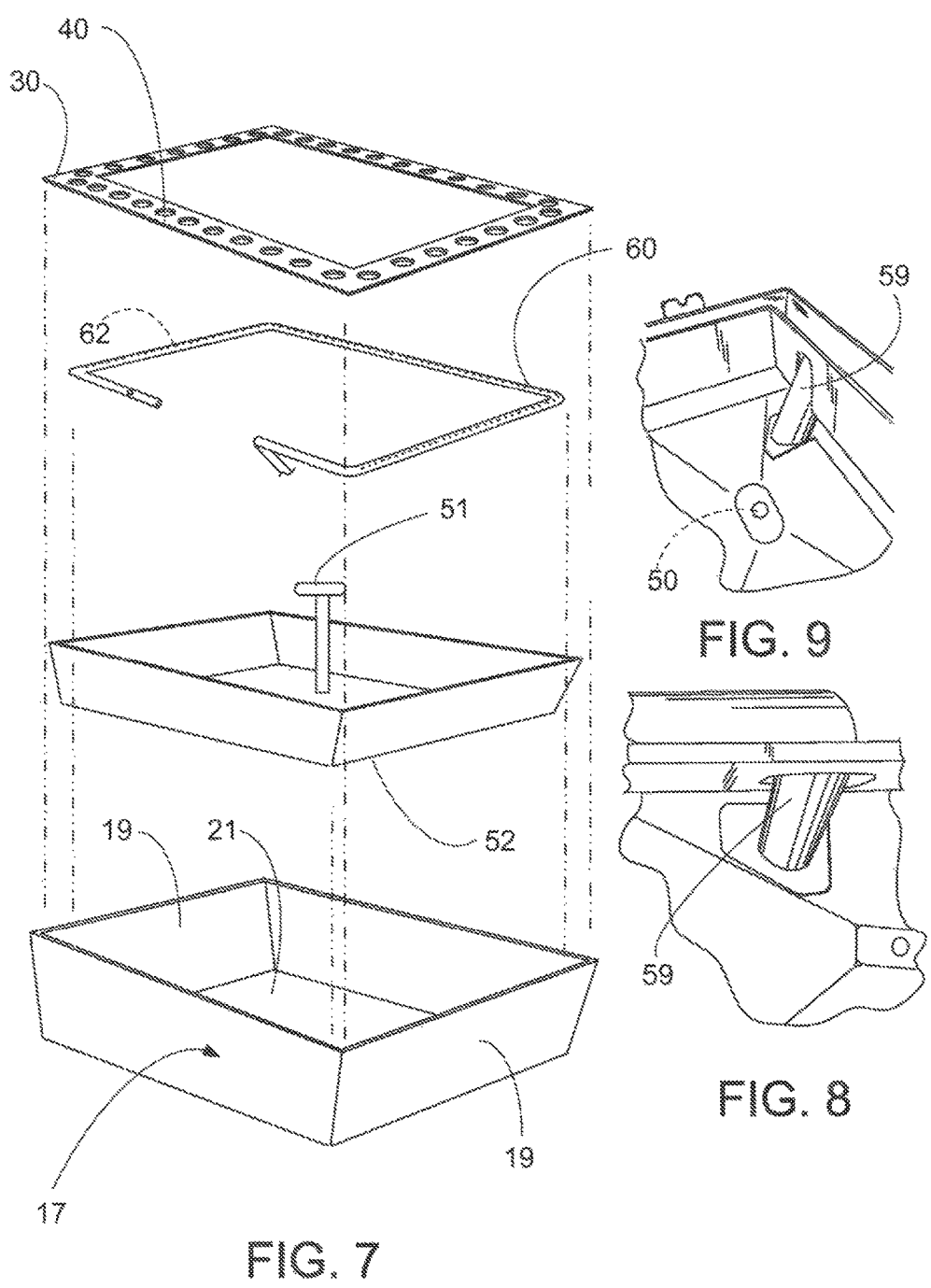
FIG. 7 illustrates an overall exploded view of sections of the preferred embodiment of the improved grill and smoker of the present invention.
FIGS. 8 and 9 illustrate view of the conduit through which propane gas or natural gas would flow between the gas tank and the burner in the preferred embodiment of the invention.

The grill assembly 15, as seen in the Figures, and particularly in exploded view in FIG. 7, includes a deep outer basket portion 17, having four walls 19, and a floor 21. This outer basket 17 includes a central opening 50, for drainage. The basket 17 in turn houses an interior tray 52 which is of the type capable of housing charcoals 49 within the tray 52. Tray 52 includes an upward extending lifting handle 51 for removing the tray 52 from basket 17 for changing or disposing of the coals 49. During use of the grill 10, if the charcoals 49 were not being used, then tray 52 would be removed. FIG. 6 also illustrates the frame 30 having openings 40 throughout its length, and the pipe 60 which will deliver the gas, as will be discussed further.

There is also provided, as seen in FIG. 2, a metal grilling surface 24 resting on the top end of the basket 17, and being encircled by the frame 30, as seen in FIG. 3. As seen further in the Figures, the removable grill surface 24 is constructed of a heavy wire mesh, and as stated earlier, the outer basket 17 has the removable grill surface 24 placed thereupon, upon which the meat 76 or the like is placed during the grilling process.

In the Figures there is illustrated a very novel concept in the invention. As stated earlier, there is illustrated the presence of an outer frame 30 surrounding the grilling surface 24, which is removable, as seen in FIGS. 3 and 6. As seen, the frame 30 is positioned within a space 32 between a first wall of the grill basket 17 and an outer wall 36 of the apparatus 10. The frame 30 includes a plurality of spaced apart openings 40, throughout its entire length, the function of which will be described further.

Figure 4:
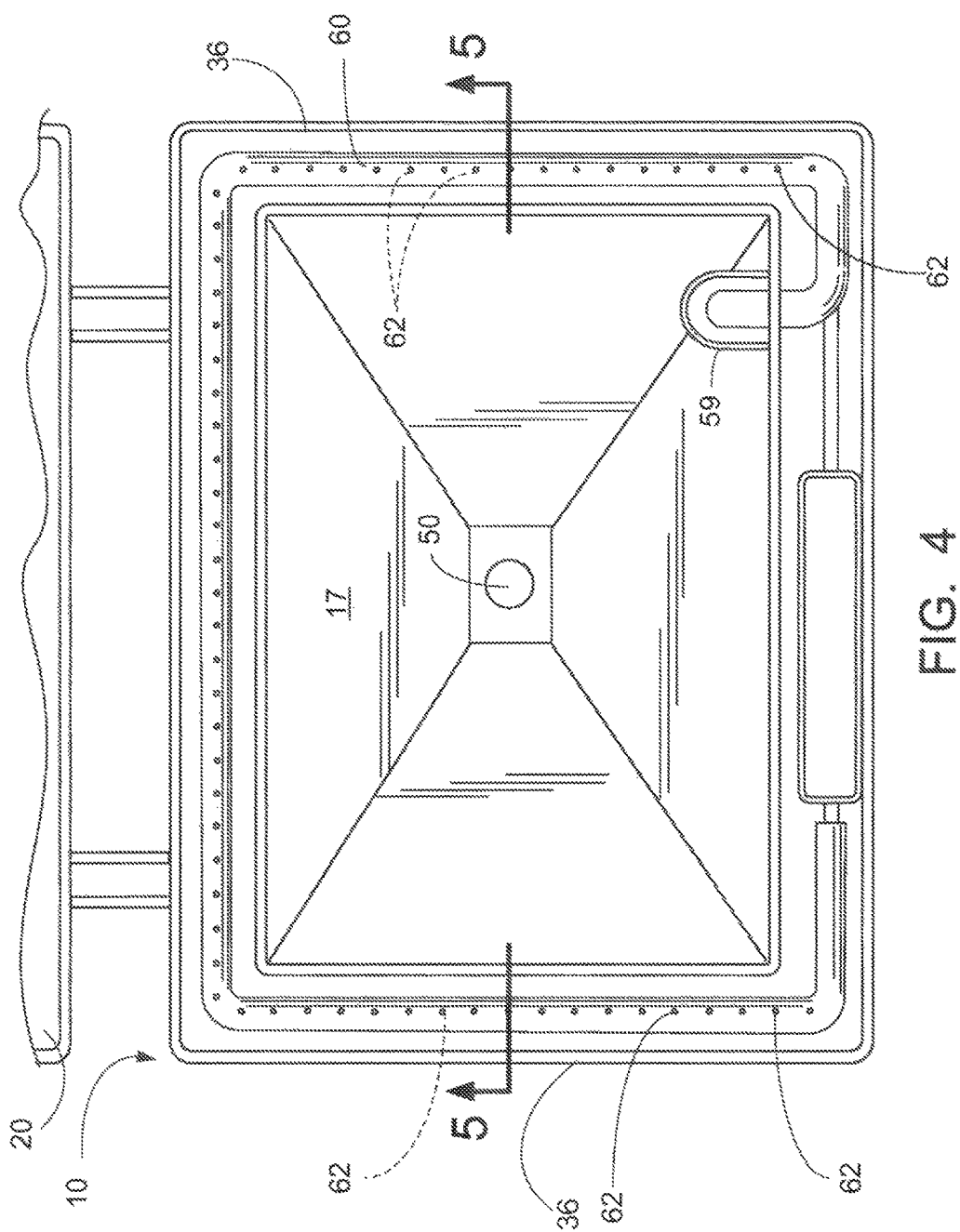
FIG. 4 illustrates a view of the grilling basket with the top opened and the grilling surface removed therefrom, and further illustrating the extended burner around the outer perimeter of the basket.

As seen in FIG. 4, when the frame 30 is removed, there is exposed a continuous pipe 60 which is positioned in space 32 between the wall of basket 17 and outer wall 36, and continues along the entire space defined by the walls of basket 17 and outer wall 36. In FIGS. 8 and 9, there is shown the delivery pipe 59 which transports natural gas from the tank 23 into the continuous pipe 60. This pipe 60 serves as the delivery system of the natural gas around the rear wall and two side walls the baskets 17 and wall 36. The gas emanates from the butane tank 23 beneath the grill into a first end of pipe 60, and which allows the gas to exit a plurality of openings 62 which are positioned close together along the entire length of pipe 60, as illustrated.

In the operation of the apparatus 10, once the frame 30 is in place around the basket 17, as seen in FIG. 3, for example, the gas flow from the tank 23 is turned on, and flows from the tank 23 through delivery pipe 59 into pipe 60. When the gas emanates from the openings 62 along the entire length of pipe 60, the gas is ignited to emit a flame 65 from the space 32 along the entire rear wall and side walls of the grill basket 17. In this way, heat is moved upward through the openings 40 in frame 30, into the closed lid 20, as seen in FIG. 5, so the heat in trapped within the lid 20 and is then directed downward (Arrows 70, FIG. 5) onto the meat which is laying on the grilling surface 24.

Unlike conventional coals, which are used to cook the meat from below the meat, in this novel system, when the pipe 60 is utilized to deliver natural gas, the heat emanates from the pipe 60 upward and forces indirect heat downward onto the meat 76, as seen in FIG. 5. It that method, the meat 76 is never exposed directly to flames emanating from below the meat, and the meat therefore is cooked very thoroughly without any flare ups or searing the meat from below. As seen in FIG. 5, when the meat 76 is cooked and drippings do occur, the drippings flow into the center port 50 at the bottom of the basket 17 so as to be collected in a container for use as gravy or the like. It should be made clear that if the user prefers heat from charcoals 49, the tray 52 containing the charcoals 49 would be placed into the basket 17, as seen in phantom view in FIG. 5, and the coals 49 could be ignited for supplying direct heat to the meat resting on surface 24.

It is foreseen that the components of this novel grilling system could be fabricated from stainless steel to enhance the life of the system. Also, as noted earlier, because the manner in which the heat is delivered, the system also serves as a smoker system, and can be used with a rotisserie during the cooking and smoking process.

PARTS LIST

The following is a list of suitable parts and materials for the various elements of the preferred embodiment of the present invention.

| Parts Number | Description |
| --- | --- |
| 10 | apparatus |
| 12 | base portion |
| 15 | grill assembly |
| 14 | legs |
| 16 | wheels |
| 16 | basket portion |
| 18 | deck |
| 19 | four walls |
| 20 | lid portion |
| 21 | floor |
| 22 | front door |
| 23 | butane tank |
| 24 | grilling surface |
| 25 | tray |
| 26 | hinges |
| 27 | tray |
| 28 | upper grill tray |
| 29 | handle |
| 30 | frame |
| 31 | rotisserie motor |
| 32 | space |
| 33 | chimneys |
| 36 | outer wall |
| 40 | openings |
| 42 | openings |
| 44 | openings |
| 49 | charcoals |
| 51 | lifting handle |
| 52 | tray member |
| 59 | gas delivery pipe |
| 60 | pipe |

-continued

| Parts Number | Description |
| --- | --- |
| 62 | openings |
| 65 | flame |
| 70 | arrows |
| 76 | meat |

The foregoing embodiments are presented by way of example only; the scope of the present invention is to be limited only by the following claims.

The invention claimed is:

1. A barbeque and smoker apparatus, comprising:
 a. a vessel, including an inner wall portion and an outer wall portion, and a floor portion;
 b. a cover moveable between an open position to a closed position, wherein in the closed position the cover covers an open end of the vessel to define an enclosed space;
 c. a grill positioned at or near the open end of the vessel;
 d. a pipe positioned between the inner wall portion and the outer wall portion along opposing sides and a rear of the vessel, the pipe operable to receive a gas from a gas source;
 e. a plurality of openings in the pipe for releasing gas through the openings;
 f. an ignition source for igniting the gas exiting the openings for defining a source of heat for the vessel, wherein in the closed configuration heat is directed into the enclosed space and downward from the cover.

2. The apparatus in claim 1, wherein the gas source is a pressurized tank or a natural gas system.

3. The apparatus in claim 1, further comprising a tray placed on the floor portion of the vessel, the tray operable to receive a second heat source.

4. The apparatus in claim 1, wherein the vessel is supported on a frame, the frame housing the gas source.

5. The apparatus in claim 4, wherein the vessel, the cover and the frame are fabricated from stainless steel.

6. The apparatus in claim 1, further comprising a rotisserie.

7. The apparatus in claim 1, wherein the vessel is configured so that heat produced from ignited gas from the pipe heats an interior of the vessel with heat traveling in a direction downwards from the cover.

8. A barbeque and smoker apparatus, comprising:
 a. an open vessel portion, having an inner wall portion and an outer wall portion, a floor portion, and a cover moveable from an open position to a closed position, wherein the cover covers an open end of the vessel to define an enclosed space;
 b. a surface for cooking food positioned in the vessel;
 c. a pipe for receiving a gas from a gas source, the pipe positioned between the inner wall portion and the outer wall portion;
 d. a plurality of openings placed in the pipe for releasing the gas through the openings;
 e. a source for igniting the gas that is released through the openings, for providing heat within the vessel.

9. The apparatus in claim 8, wherein the gas source is a pressurized tank or a natural gas system.

10. The apparatus in claim 8, further comprising an opening in the floor of the vessel.

11. The apparatus in claim 8, wherein the vessel is supported on a frame, the frame housing the source for igniting the gas.

12. The apparatus in claim 11, wherein the vessel, the movable cover and the frame are fabricated from stainless steel.

13. The apparatus in claim 8, further comprising a rotisserie positioned above the surface for cooking food.

14. The apparatus in claim 8, wherein the barbeque and smoker apparatus is operable to provide heat to the enclosed space of the vessel, wherein heat travels from an upper portion of the enclosed space and downward.

15. A smoker apparatus comprising:
 a. a basket having an open upper portion, an inner wall portion, an outer wall portion, and a bottom;
 b. a movable cover on the basket, the moveable cover operable to move from an open position to a closed position, wherein in the closed position the cover is over the open upper portion of the basket;
 c. a heat source positioned between the inner wall portion and the outer wall portion; and
 d. wherein when the cover is in the closed position the heat source is operable to direct heat in a direction downward from the cover.

16. The smoker apparatus of claim 15 wherein the heat source is a pipe for receiving a gas to flow therethrough.

17. The smoker apparatus of claim 15 wherein the heat source includes a pipe for receiving a gas to flow therethough and wherein the smoker apparatus includes an ignition source.

18. The smoker apparatus of claim 15 further comprising a tray or plate positionable on the bottom of the basket, the tray or plate operable to receive a second heat source.

19. The smoker apparatus of claim 18 wherein the second heat source is different from the heat source between the inner and outer wall portions.

20. The smoker apparatus of claim 15 further comprising a surface for cooking food thereon.

21. The smoker apparatus of claim 20 further comprising a rotisserie.

22. The smoker apparatus of claim 20 further comprising a tray positionable on the bottom of the basket for receiving a second heat source.

23. The smoker apparatus of claim 20 further comprising more than one surface for cooking food thereon, wherein at least one of the said surfaces is positioned above another of the said surfaces.

24. The smoker apparatus of claim 22 further comprising a rotisserie above the surface for cooking food thereon.

25. The smoker apparatus of claim 17 wherein the pipe has a plurality of openings for releasing gas upwards from the pipe, and the apparatus further comprises a plate comprising a plurality of openings, the plate positioned above the pipe and between the inner and outer wall portions.

26. The smoker apparatus of claim 16 wherein the pipe includes a series of openings and extends between the inner and outer wall portions from a first side of the basket, around a corner of the basket and to an opposing side of the basket.

27. The smoker apparatus of claim 15 wherein the bottom of the basket includes an opening, and the smoker apparatus further comprises a container for receiving material flowing or falling through the opening.

28. The smoker apparatus of claim 15 wherein the cover includes an outlet for releasing heat.

29. The smoker apparatus of claim 15 wherein the cover includes more than one outlet for releasing heat.

30. The smoker apparatus of claim 15 further comprising more than one surface for cooking food.

* * * * *